(12) United States Patent
North et al.

(10) Patent No.: US 9,671,838 B2
(45) Date of Patent: Jun. 6, 2017

(54) COMPOSITE CHASSIS FOR LOWERING SURFACE TEMPERATURE

(71) Applicant: Dell Products L.P., Round Rock, TX (US)

(72) Inventors: Travis C. North, Cedar Park, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 560 days.

(21) Appl. No.: 13/738,271

(22) Filed: Jan. 10, 2013

(65) Prior Publication Data

US 2014/0192474 A1    Jul. 10, 2014

(51) Int. Cl.
    *G06F 1/20*      (2006.01)
    *G06F 1/16*      (2006.01)

(52) U.S. Cl.
    CPC ............ *G06F 1/203* (2013.01); *G06F 1/1626* (2013.01); *Y10T 156/10* (2015.01)

(58) Field of Classification Search
    CPC ................. G06F 1/1626; G06F 1/203
    See application file for complete search history.

(56) References Cited

U.S. PATENT DOCUMENTS

| | | | | |
|---|---|---|---|---|
| 6,548,767 | B1* | 4/2003 | Lee | 174/262 |
| 6,949,289 | B1* | 9/2005 | Lawton et al. | 428/372 |
| 8,215,223 | B2* | 7/2012 | Lucuta et al. | 89/36.02 |
| 8,358,066 | B1* | 1/2013 | Aurongzeb | 313/512 |
| 8,873,226 | B1* | 10/2014 | Peters et al. | 361/679.01 |
| 2005/0012723 | A1* | 1/2005 | Pallakoff | 345/173 |
| 2005/0100728 | A1* | 5/2005 | Ristic-Lehmann et al. | 428/323 |
| 2006/0086493 | A1* | 4/2006 | Fujiwara et al. | 165/185 |
| 2006/0126304 | A1* | 6/2006 | Smalc et al. | 361/704 |
| 2007/0059901 | A1* | 3/2007 | Majumdar et al. | 438/455 |
| 2009/0110852 | A1* | 4/2009 | Chiang | 428/34.7 |
| 2010/0128416 | A1* | 5/2010 | Hwang et al. | 361/529 |

(Continued)

OTHER PUBLICATIONS

Xianping Lu, Ove Nilsson, and Jochen Fricke; "Thermal and Electrical Conductivity of Monolithic Carbon Aerogels;" Jan. 15, 1993; pp. 581-584; J. Appl. Phys. 73 (2); American Institute of Physics.

(Continued)

*Primary Examiner* — David M Sinclair
*Assistant Examiner* — Robert Brown
(74) *Attorney, Agent, or Firm* — Haynes and Boone, LLP (57) ABSTRACT

An IHS chassis defines an IHS housing that houses a plurality of IHS components. The IHS chassis includes an outer surface located opposite the IHS chassis from the IHS housing. A first layer of the IHS chassis provides the outer surface of the IHS chassis. The first layer includes a first layer oxidized surface located opposite the first layer from the outer surface of the chassis base. A second layer of the chassis base is located immediately adjacent the IHS housing. The second layer includes a carbide-based composite material that provides a thermal conductivity of less than 1 watt per meter-kelvin in a direction that is generally perpendicular to the outer surface of the IHS chassis, while providing a thermal conductivity of at least 100 W/mK in directions that are generally parallel to the outer surface of the IHS chassis.

12 Claims, 6 Drawing Sheets

(56) References Cited

U.S. PATENT DOCUMENTS

| | | | | |
|---|---|---|---|---|
| 2011/0019123 | A1* | 1/2011 | Prest et al. | 349/58 |
| 2011/0114924 | A1* | 5/2011 | Aurongzeb et al. | 257/40 |
| 2011/0170221 | A1* | 7/2011 | Koyama | 361/93.8 |
| 2012/0011438 | A1* | 1/2012 | Kim et al. | 715/702 |
| 2012/0187112 | A1* | 7/2012 | Demol et al. | 219/649 |
| 2012/0206870 | A1* | 8/2012 | Weber et al. | 361/679.01 |
| 2012/0314354 | A1* | 12/2012 | Rayner | 361/679.01 |
| 2012/0327632 | A1* | 12/2012 | Park et al. | 362/97.1 |
| 2013/0057785 | A1* | 3/2013 | Hiratomo et al. | 348/843 |
| 2013/0257712 | A1* | 10/2013 | Imamura | 345/156 |
| 2013/0329366 | A1* | 12/2013 | Wang et al. | 361/704 |
| 2014/0099472 | A1* | 4/2014 | Greenhill et al. | 428/147 |

OTHER PUBLICATIONS

P. Kim, L. Shi, A. Majumdar and P.L. McEuen; "Thermal Transport Measurements of Individual Multiwalled Nanotubes;" Nov. 19, 2001; pp. 215502-1-215502-4; vol. 87, No. 21.

Alexander A. Balandin, Suchismita Ghosh, Wenzhong Bao, Irene Calizo, Desalegne Teweldebrhn, Feng Miao and Chun Ning Lau; "Superior Thermal Conductivity of Single-Layer Graphene;" 2008; pp. 902-907; vol. 8, No. 3; Nano Letters; American Chemical Society.

S. Gosh, I. Calizo, D. Teweldebrhan, E.P. Pokatilov; D.L. Nika, A.A. Balandin, W. Bao, F.Miao and C.N. Lau; "Extremely High Thermal Conductivity of Graphene: Prospects for Thermal Management Applications in Nanoelectronic Circuits;" 2008; pp. 151911-1-151911-3; American Physics Letters 92.

Zhixin Guo, Dier Zhang and Xin-Geo Gong; "Thermal Conductivity of Graphene Nanoribbons;" 2009; pp. 163103-1-163103-3; Applied Physics Letters 95.

\* cited by examiner

COMPOSITE CHASSIS FOR LOWERING SURFACE TEMPERATURE

BACKGROUND

The present disclosure relates generally to information handling systems, and more particularly to composite chassis for lowing the surface temperature of an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As IHS components become smaller and more powerful, the ability to greatly reduce the weight and dimensions of the IHS has been realized. These dimension and weight reductions have resulted in "ultrathin" IHSs with IHS chassis that are approximately half an inch thick and that are expected to reduce even further in thickness in the future. As the thickness of IHS chassis reduces, the heat produced by the IHS components in those IHS chassis becomes an issue, as "hot spots" can develop on portions of the outer surface of the IHS chassis that are adjacent to heat producing components (e.g., a processing system) in the IHS chassis. Those "hot spots" can reach temperatures that are uncomfortable for a user, and may even limit the thinness of the IHS chassis so that such "hot spots" do not become dangerous for the user. As thinness is becomes desirable and sometimes differentiating feature of IHSs, the limits imposed by "hot spots" on the outer surface of the IHS chassis may require undesirable tradeoffs between IHS chassis thickness and IHS performance to prevent "hot spots" over a given temperature.

Accordingly, it would be desirable to provide an improved IHS chassis.

SUMMARY

According to one embodiment, an information handling system chassis includes a chassis base defining an IHS housing that is operable to house a plurality of IHS components, wherein the chassis base includes an outer surface located opposite the chassis base from the IHS housing; a first layer of the chassis base that provides the outer surface of the chassis base, wherein the first layer includes an first layer oxidized surface located opposite the first layer from the outer surface of the chassis base; and a second layer of the chassis base that is located immediately adjacent the IHS housing, wherein the second layer includes a carbide-based composite material and that provides a thermal conductivity of less than 1 watt per meter-kelvin in a direction that is generally perpendicular to the outer surface of the chassis base, while providing a thermal conductivity of at least 100 W/mK in directions that are generally parallel to the outer surface of the chassis base.

BRIEF DESCRIPTION OF THE DRAWINGS

FIG. 2b is a bottom perspective view illustrating an embodiment of the information handling system of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
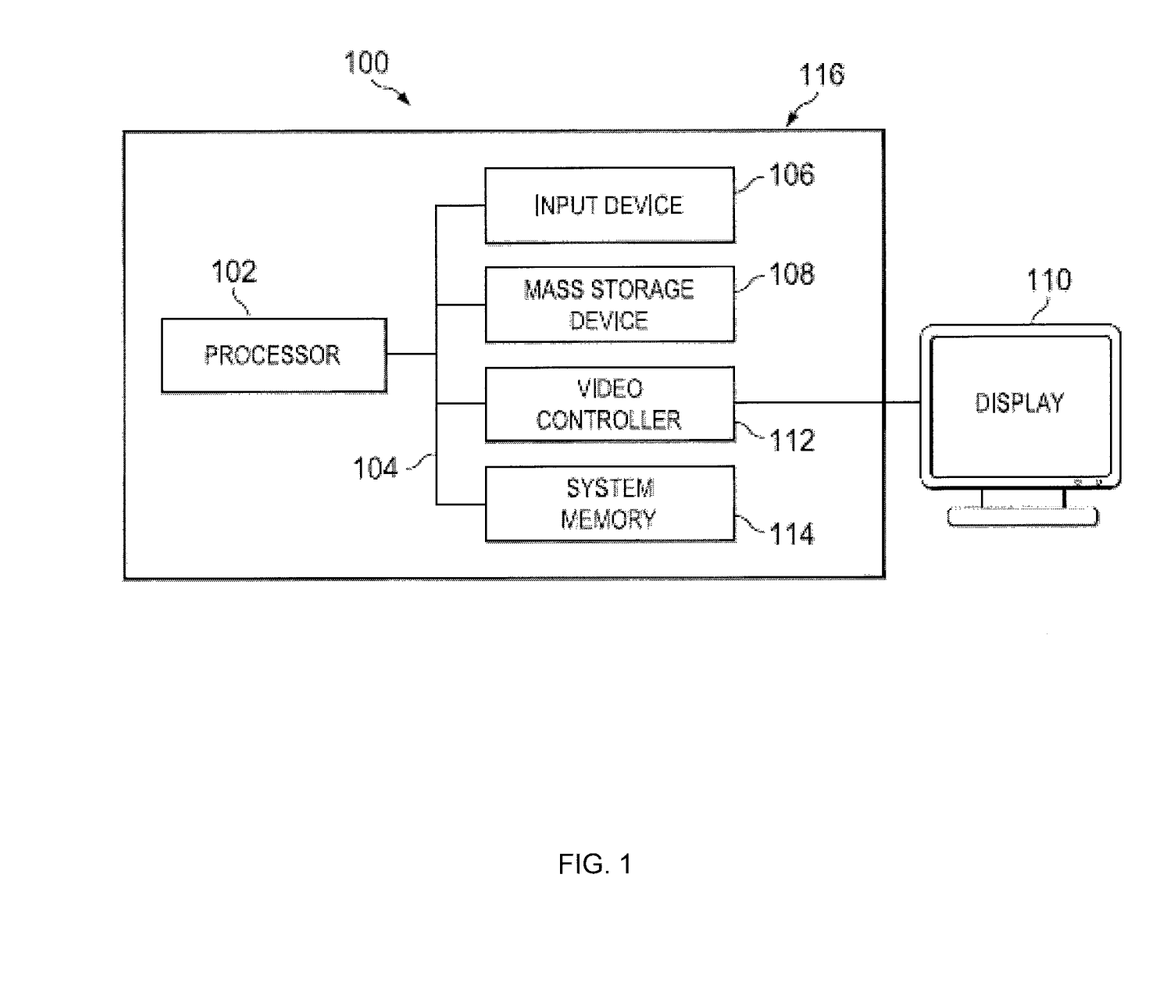
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
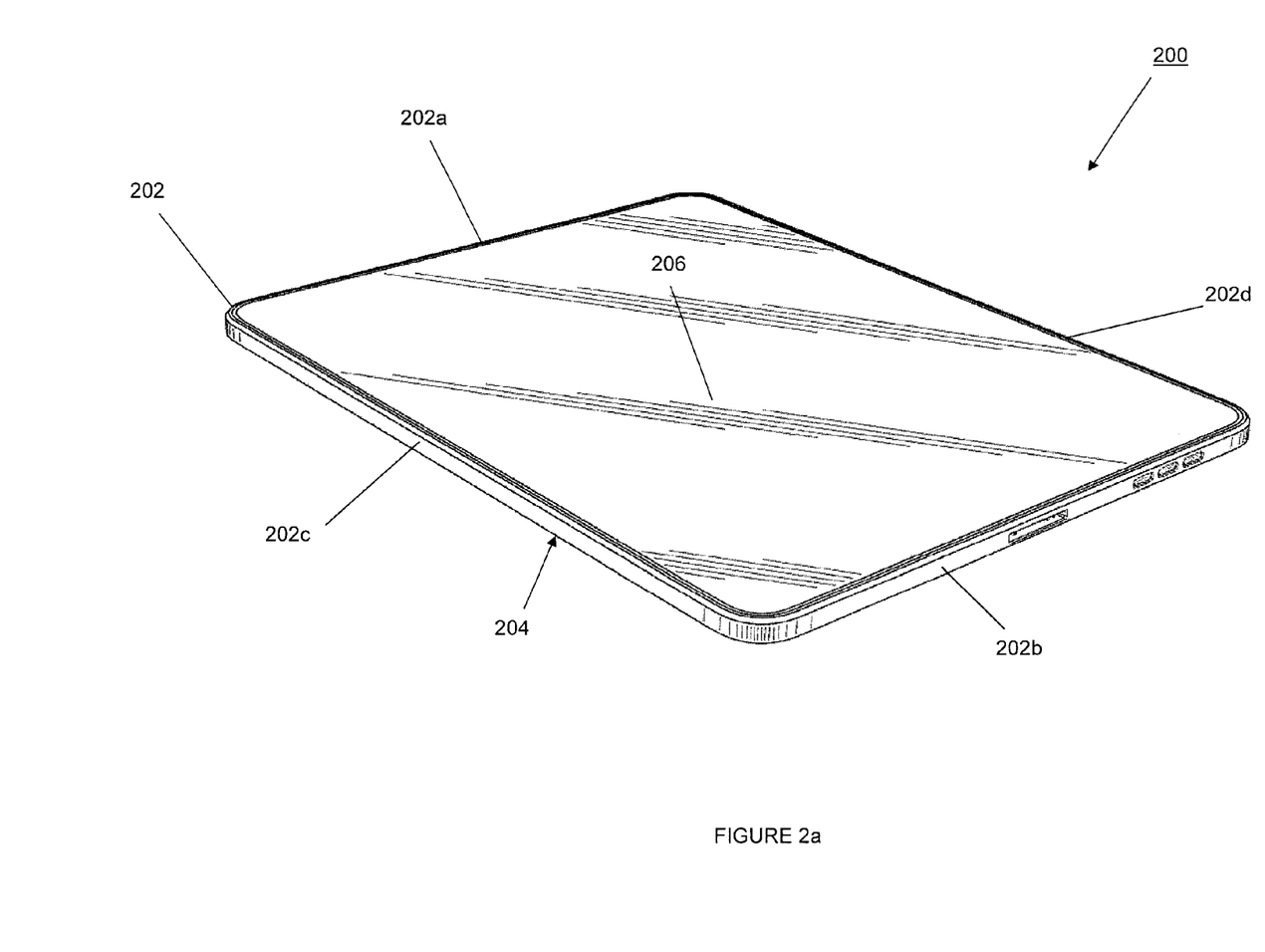
FIG. 2a is a top perspective view illustrating an embodiment of an information handling system.
Figure 2B:
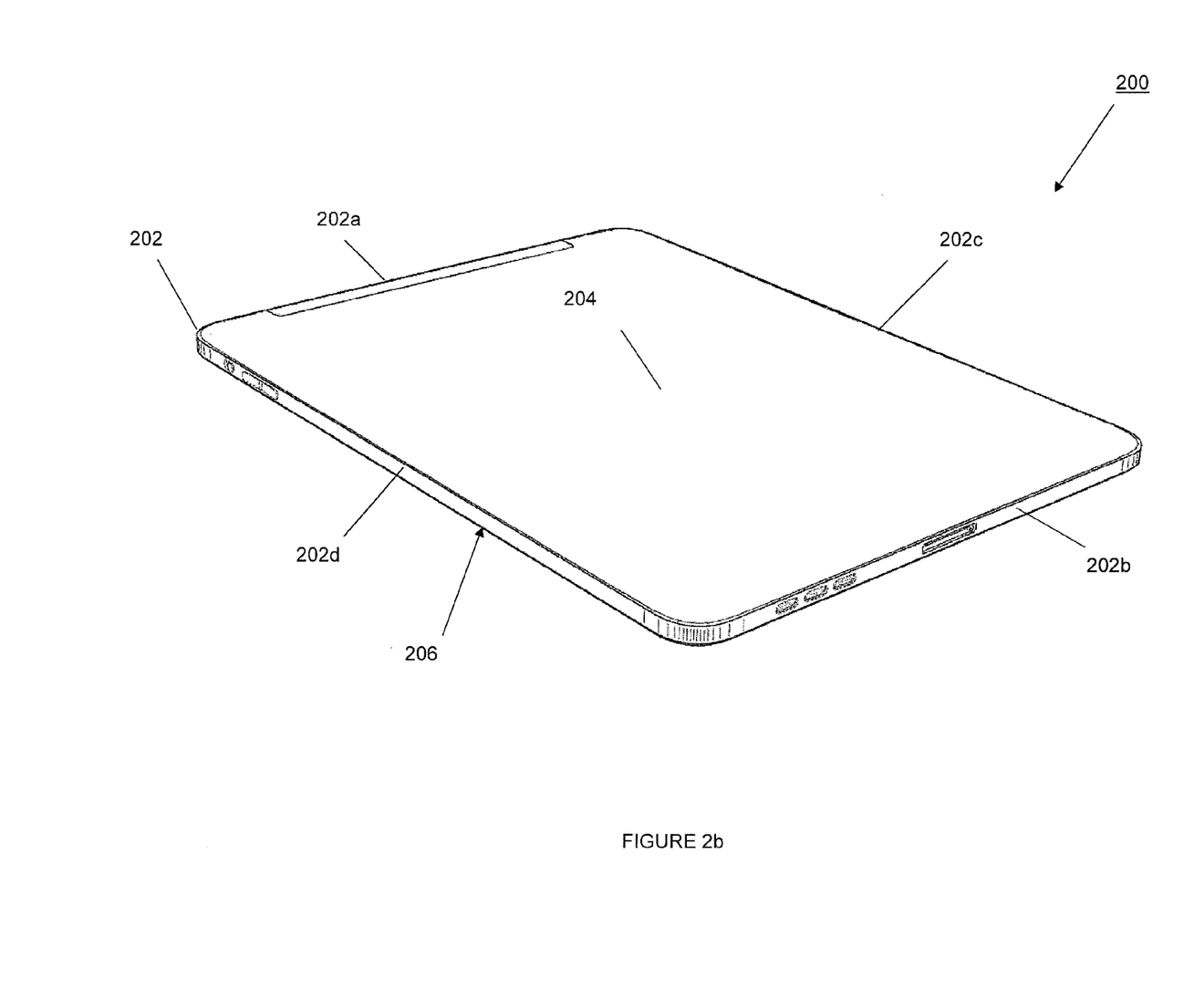
Figure 2C:
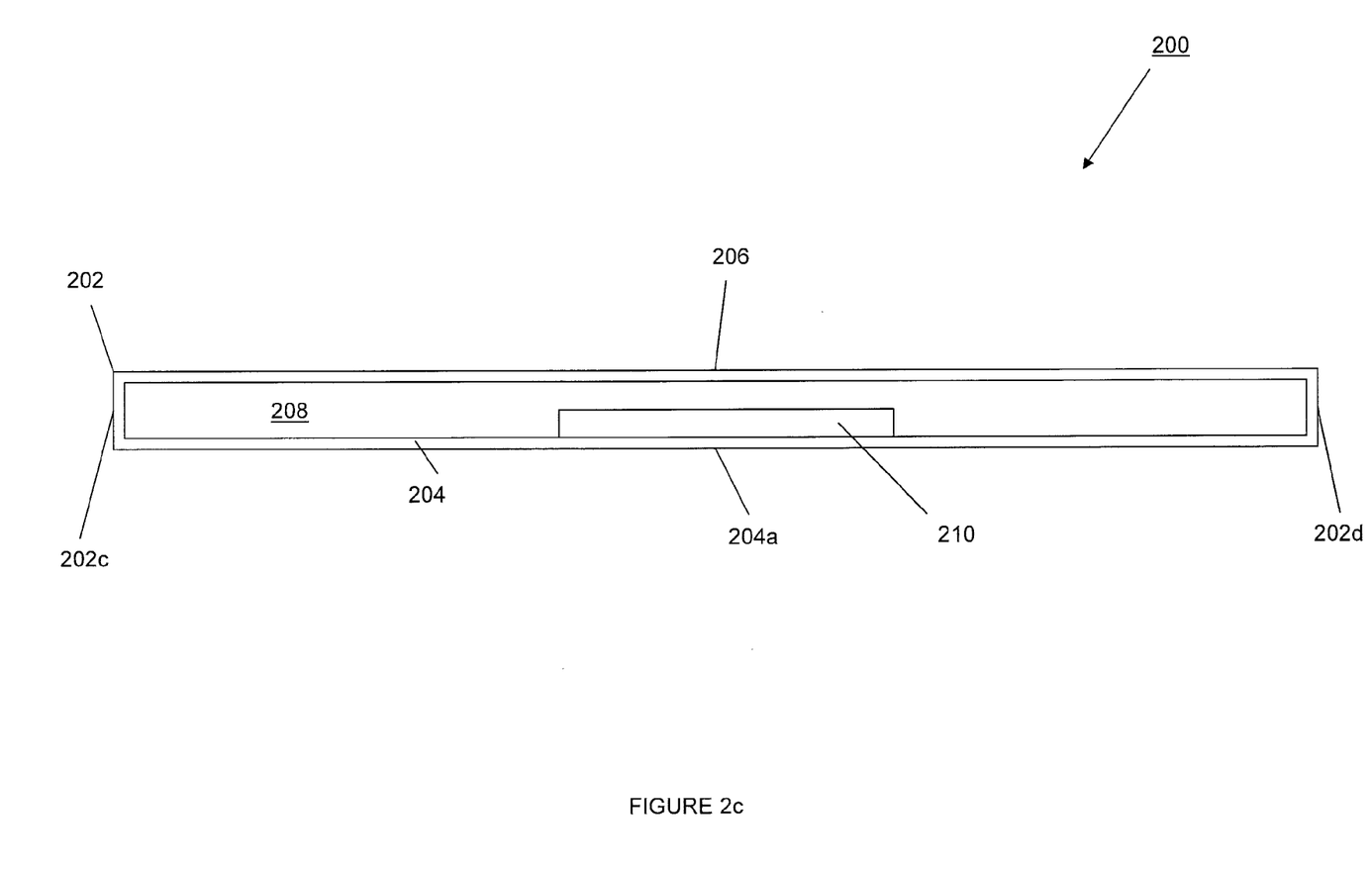
FIG. 2c is a cross-sectional view illustrating an embodiment of the information handling system of FIGS. 2a and 2b.

Referring now to FIGS. 2a, 2b, and 2c an embodiment of an IHS 200 is illustrated. In an embodiment, the IHS 200 may be the IHS 100, discussed above with reference to FIG. 1, and/or may include some or all of the components of the IHS 100. In the illustrated embodiment, the IHS 200 is a tablet IHS. However, the teachings of the present disclosure may be applied to a variety of IHSs known in the art, each of which may include a thin-walled chassis similar to the tablet IHS discussed below, and each of which may benefit from the teachings of the present disclosure. The IHS 200 includes a chassis base 202 having a top edge 202a, a bottom edge 202b located opposite the chassis base 202 from the top edge 202a, and a plurality of side edges 202c and 202d extending between the top edge 202a and the bottom edge 202b and on opposite sides of the chassis base 202. The chassis base 202 includes a wall 204 that provides a rear surface 204a of the IHS 200 that that extends between the top edge 202a, the bottom edge 202b, and the side edges 202c and 202d. The wall 204 is an example of a thin-wall chassis structure that is provided by the present disclosure and which may be provided as any thin wall chassis structure on the IHS 200 (e.g., providing the side surfaces 202c or 202d, providing a bezel that includes some of front surface 206, and/or providing any other chassis structure known in the art), and is discussed in further detail below A front surface 206 is provided on the IHS 200 opposite the rear surface 204 and extending between the top edge 202a, the bottom edge 202b, and the side edges 202c and 202d. The IHS 200 defines an IHS housing 208 between the front surface 206, the rear surface 204, the top edge 202a, the bottom edge 202b, and the side edges 202c and 202d. In different embodiments and/or at different locations on the front surface 206, the front surface 206 may be part of the chassis base 202 (e.g., on a bezel adjacent a display device) or part of a component (e.g., display screen glass) that couples to the chassis base 202. The IHS housing 208 houses a plurality of components of the IHS 200 including the component 210 of the illustrated embodiment. In an embodiment, the component 210 may be a processor (e.g., the processor 102 discussed above with reference to FIG. 1), a memory (e.g., the memory 114 discussed above with reference to FIG. 1), and/or a variety of other IHS components known in the art. One of skill in the art will recognize that a display (e.g., the display 110 of FIG. 1) may be provided such that it includes or is visible through the front surface 206 of the IHS 200.

Figure 3:
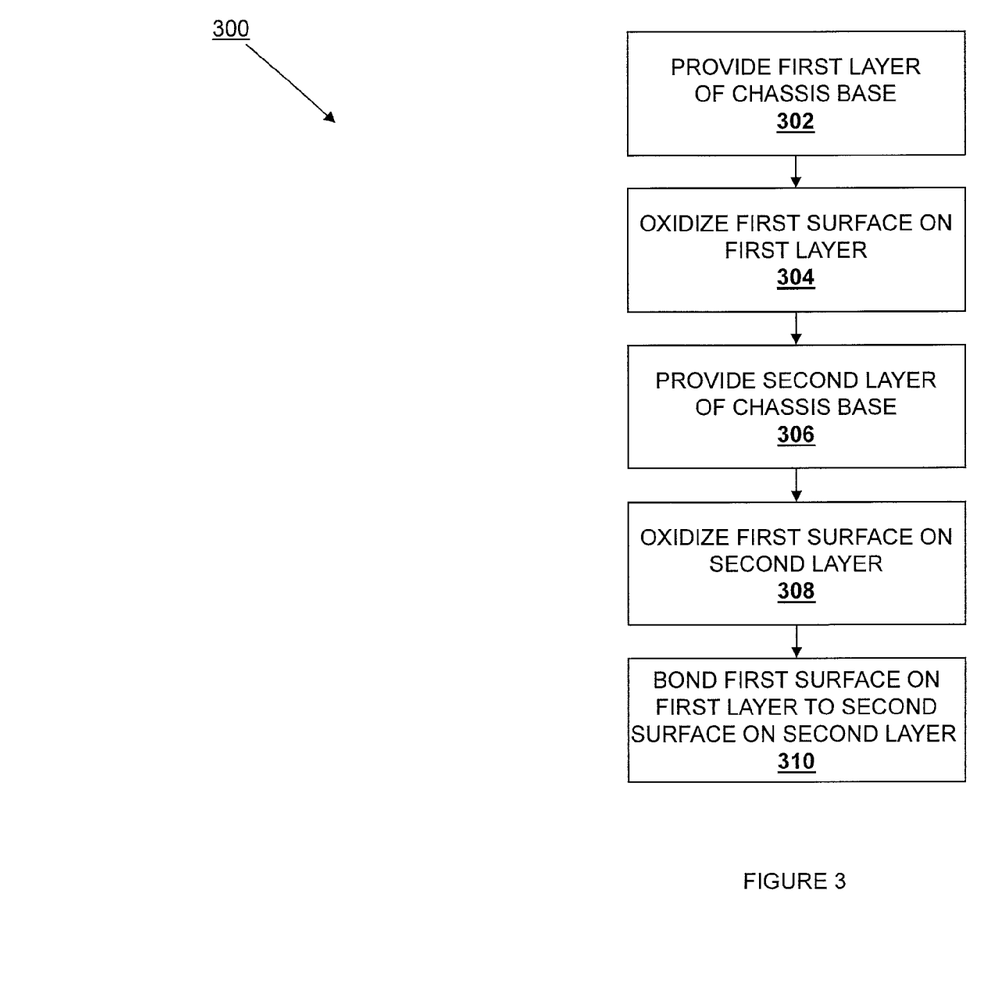
FIG. 3 is a flow chart illustrating a method for providing an information handling system chassis.
Figure 4:
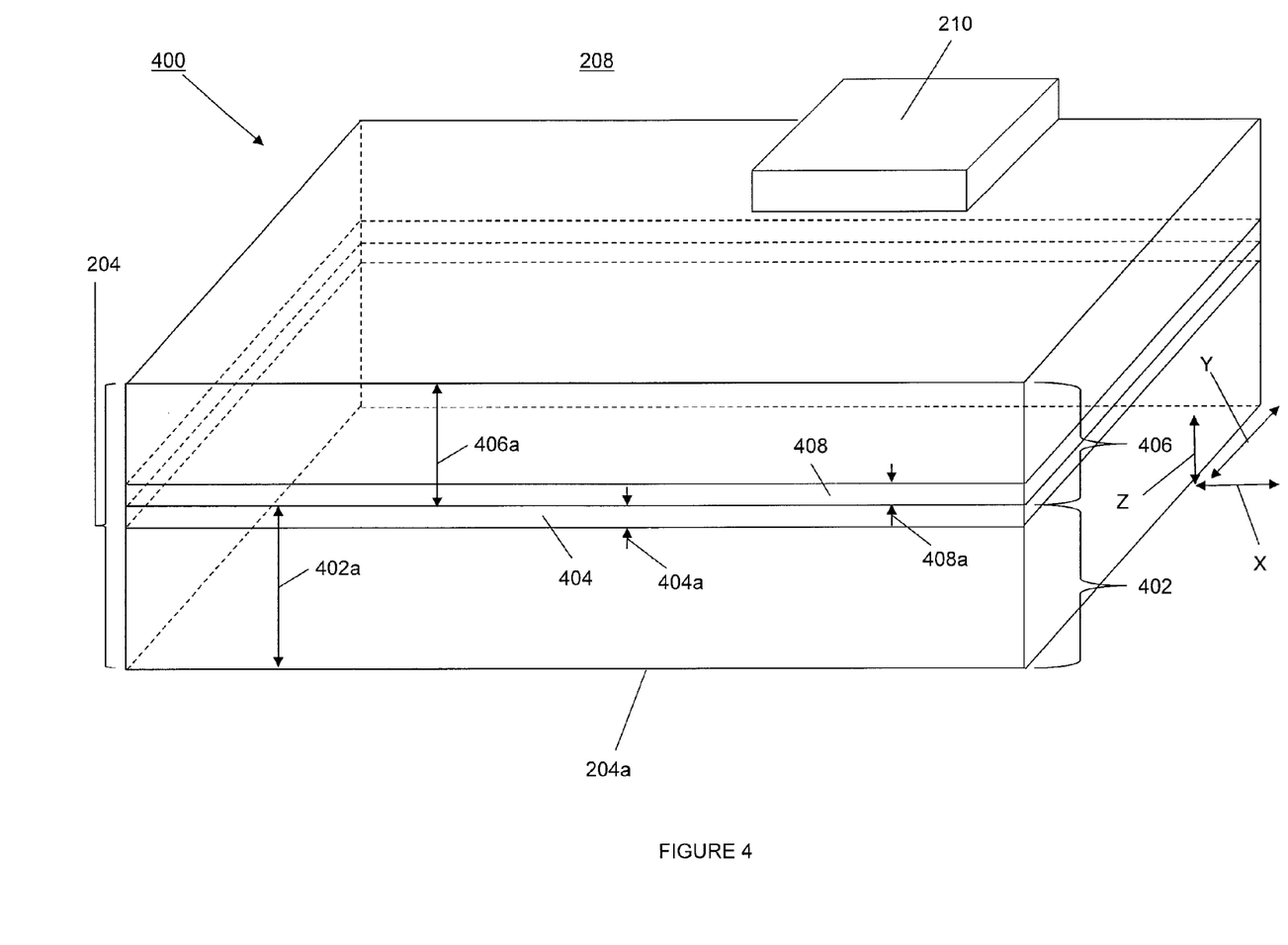
FIG. 4 is a perspective view illustrating an embodiment of a wall of the information handling system of FIGS. 2a, 2b, and 2c.

Referring now to FIGS. 3 and 4, an embodiment of a method 300 for providing an IHS chassis is illustrated. The discussion of the method 300 includes references to an embodiment of a thin-wall section 400, illustrated in FIG. 4, on the chassis base 202 of the IHS 200 of FIG. 2. Thus, similar features of the thin walled section 400 and the chassis base 202 include similar reference numbers, including the wall 204, the outer surface 204a, the IHS housing 208, and the component 210. However, as discussed above, the method 300 and thin-wall section 400 may be provided on a variety of chassis structures without departing from the scope of the present disclosure. Furthermore, FIG. 4 illustrates a chassis base 202 completed according to the method 300, but one of skill in the art will recognize that the operations performed during the method 300 (e.g., oxidation, bonding, etc.) may be performed on portions of the thin-wall section 400 (e.g., solely on the first layer, solely on the second layer, etc.) before the chassis base 202 is completed as illustrated.

The method 300 begins at block 302 where a first layer of a chassis base is provided. In an embodiment, a first layer 402 that provides a portion of the wall 204 of the chassis base 202 is provided. In an embodiment, the first layer 402 may include an Aluminum material, a Magnesium material, and/or a variety of other chassis materials known in the art. For example, the first layer 402 may include an Aluminum alloy having 95 weight percent (wt. %) Aluminum and 5 wt. % other materials such as, for example, Silicon, Iron, Titanium, Lithium, and/or a variety of other Aluminum alloying materials known in the art. In another example, the first layer 402 may include a Magnesium alloy having 95 weight percent (wt. %) Magnesium and 5 wt. % other materials such as, for example, Aluminum, Silicon, Magnesium, Iron, Silver, Copper, Titanium and/or a variety of other Magnesium alloying materials known in the art. An embodiment, the first layer 402 may include a thickness 402a of approximately 0.4 to 1 millimeter, although thicker or thinner embodiments will still fall within the scope of the present disclosure. In an embodiment, the first layer 402 may include a thermal conductivity of between 100-250 W/mK.

The method 300 then proceeds to block 304 where a first surface on the first layer is oxidized. In an embodiment, at least one surface on the first layer 402 is oxidized to provide a first layer oxidized surface 404. For example, the first layer 402 may have at least one surface oxidized by thermal oxidation, chemical vapor deposition (CVD) of the first layer oxidized surface 404, and/or using a variety of other oxidizing techniques known in the art. In one embodiment, the first layer 402 includes an Aluminum material and the oxidizing the first surface of the first layer at block 404 provides a first layer oxidized surface 404 that includes an Aluminum oxide material. In another embodiment, the first layer 402 includes a Magnesium material and the oxidizing the first surface of the first layer at block 304 provides a first layer oxidized surface 404 that includes a Magnesium oxide material. In an embodiment, the first layer oxidized surface 404 may include a thickness 404a of approximately 10 micrometers or less, although thicker or thinner embodiments will still fall within the scope of the present disclosure. In an embodiment, the first layer oxidized surface 404 may include a thermal conductivity of approximately 1-30 W/mK, which may vary based on the density first layer oxidized surface 404, the process used to create the first layer oxidized surface 404, and/or a variety of other factors known in the art.

The method 300 then proceeds to block 306 where a second layer of the chassis base is provided. In an embodiment, a second layer 406 that provides a portion of the wall 204 of the chassis base 202 is provided. In an embodiment, the second layer 406 includes a carbide-based composite material. For example, the second layer 406 may include a graphene composite material such as a graphene and polymer composite material, a graphene and aerogel composite material, a graphene and polymer and aerogel composite material, a graphene, polymer, and ceramic fiber composite material, and/or a variety of other graphene composite materials known in the art. For example, the graphene composite material may include a ceramic fiber such as alumina, silica, and/or a polyacrylonitrile type fiber, a commercially available polymer fiber such as Pyron®, and/or a variety of other fiber materials known in the art. In one embodiment, the use of a polystyrene-based material that has relatively low thermal conductivity (e.g., less than 0.2 W/mK) and is relatively cheap in cost and can be implemented without an aerogel (e.g., the graphene composite material would include graphene and polystyrene.) In another embodiment, a graphene polymer aerogel composite would include a thickness of approximately 500 micrometers or less for a 1 millimeter thick chassis (e.g., the thickness of the wall 204 measured from the outer surface 204a to the IHS housing 208.) In an embodiment, the second layer 406 may include a thickness 406a of less than 200 micrometers, although thicker or thinner embodiments will still fall within the scope of the present disclosure. In an embodiment, the second layer 406 includes a thermal conductivity of between 100 and 500 Watts per meter-Kelvin (W/mK) in an X and Y direction (i.e., in directions generally parallel to the outer surface 204a of the chassis base 202, discussed in further detail below), while including a thermal conductivity of less than 5 W/mK in a Z direction (i.e., in a direction generally perpendicular to the outer surface 204a of the chassis base 202, discussed in further detail below), although other thermal conductivities are envisioned as falling within the scope of the present disclosure.

The method 300 then proceeds to block 308 where a first surface on the second layer may be oxidized. In some embodiments, a surface on the second layer may be oxidized to assist in bonding of the second layer to the first layer (e.g., when the second layer includes a carbide-based composite including, for example, a polymer that does not bond sufficiently with the first layer oxide surface, discussed oxide). In other embodiments, oxidation of the second layer may not be necessary to bond the second layer to the first layer (e.g., when the second layer includes a carbide-based composite including polymer or a polymer/aerogel, each of which may be bonded to the first surface oxidized layer 404 directly and without the need for an oxidized surface, discussed below.)

In embodiments where an oxidized surface on the second layer helps in bonding the second layer to the first layer, at least one surface on the second layer 406 is oxidized to provide a second layer oxidized surface 408. For example, the second layer 406 may have at least one surface oxidized using hard anodization techniques, thermal oxidation, and/or using a variety of other oxidizing techniques known in the art. In one embodiment, the second layer 406 includes a carbide-based composite material and the oxidizing the first surface of the second layer at block 304 provides a second layer oxidized surface 408 that includes a carbide-based composite oxide material. For example, the second layer 406 may include a graphene and polymer composite material, and the second layer oxidized surface 408 will include an oxidized graphene material (e.g., graphene oxide.) In another example, the second layer 406 may include a graphene and polymer and aerogel composite material, and the second layer oxidized surface 408 will include a graphene oxide/polymer/aerogel material mix. In an embodiment, the second layer oxidized surface 408 may include a thickness 408a of less than 100 micrometers, although thicker or thinner embodiments will still fall within the scope of the present disclosure. In an embodiment, the second layer oxidized surface 408 includes a thermal conductivity of less than 1-50 W/mK, and typically around 1-2 W/mK depending on process conditions, although other relatively low thermal conductivities (e.g. relative to the portion of the second layer 406 that is not oxidized) are envisioned as falling within the scope of the present disclosure. In an embodiment, the second layer oxidized surface 408 may be tuned to block infrared radiation by, for example, depositing 100 nanometers of Silver, Zinc, and/or Tin on the second layer 406 and heat treating the second layer 406 below the melting point of the second layer 406 (e.g., below the melting point of Aluminum.)

The method 300 then proceeds to block 310 where the first surface on the first layer is bonded to the second surface on the second layer. In an embodiment, the first layer oxidized surface 404 on the first layer 402 is bonded to the second layer oxidized surface 408 on the second layer 406 to provide the chassis base 202 including thin walled section 400. For example, the first layer oxidized surface 404 may be bonded to the second layer oxidized surface 406 using diffusion bonding techniques, thermal bonding, thermoplastic melt bonding, and/or a variety of other bonding techniques known in the art. The bonding of carbide-based composite materials such as graphene composite materials to IHS chassis materials such as Aluminum alloys or Magnesium alloys is complicated by a variety of reasons that prevent a strong bond from being achieved between the two layers. For example, direct bonding of a graphene sheet to Aluminum may be provided by melting of the aluminum, but the surface of the graphene tends to become brittle upon cooling and can crack under deflection. However, it has been found that oxidizing a surface on the Aluminum alloy or Magnesium alloy layer allowed for a bond to be created that is sufficiently strong. In some examples, providing an oxidized layer on the graphene composite layer assists in bonding to the oxidized Aluminum alloy layer or the oxidized Magnesium alloy layer in situations where the polymer in the graphene composite material does not provide a sufficient bond with the oxidized Aluminum alloy layer or the oxidized Magnesium alloy layer. In other examples, graphene composite materials including a polymer based composite need not be oxidized, as the oxidized surface of the Aluminum alloy layer or the oxidized Magnesium alloy layer is porous and rough and allows the organic polymer material in the graphene composite layer to "lock" with the Aluminum alloy layer or the oxidized Magnesium alloy layer during the process of melting and cooling the organic polymer material.

As can be seen on the thin-walled section 400 of the chassis base 202 in FIG. 4, the bonding of the first layer 402 to the second layer 406 provides the chassis base 202 having the first layer 402 providing the outer surface 204a of the IHS 200, with the first layer oxidized surface 404 located opposite the first layer 402 from the outer surface 204a. As can also be seen, the second layer 406 is bonded to the first layer 402 via the bonding of the first layer oxidized surface 404 and the second layer oxidized surface 408, and the second layer 406 is located immediately adjacent the IHS housing 208. As discussed above, the second layer oxidized surface 408 may not be present, for example, when the carbide-based composite material first layer includes a polymer materials. While the illustrated embodiment, including only the first layer 402 and the second layer 406, provides for very thin wall sections of the chassis base 202 having desirable thermal properties, discussed in further detail below, other embodiments may add additional layers to that illustrated depending on the requirements of the IHS without departing from the scope of the present disclosure. In fact, the wall 204 including the first layer 402 and the second layer 406 may be provided thin enough that an extra layer or layers will still provide a thinner walled chassis base than is possible with conventional techniques.

In operation, the chassis base 202 may include the component 210 located on or coupled to the second layer 406, as illustrated in FIG. 4, and the component 210 may produce heat that is then transferred to the second layer 406. For example, the component 210 may be a processor, a memory device, and/or other heat producing IHS component known in the art that is located in the IHS housing 208 and coupled to the second layer 406 through a circuit board. FIG. 4 defines an X-direction indicator, a Y-direction indicator, and a Z-direction indicator that may be used to described the conduction of heat from the component 210 through the wall 204 of the chassis base 202. As discussed above, the second layer 406 has a relatively high thermal conductivity in the X and Y directions as opposed to the Z-direction (e.g., 100-500 W/mK for compared to approximately 1 W/mK, respectively, in one example), which allows the heat from the component 210 to spread quickly in the X and Y directions throughout the second layer 406. However, the very low relative thermal conductivity in the Z direction results in the heat from the component 210 spreading quickly through the wall 204 in the X and Y directions while spreading slowly in the Z direction. Once the heat from the component 210 moves through the second layer in the Z-direction, it may flow through the first layer oxidized surface 404 and the first layer 402, which have thermal conductivities of approximately 1-30 W/mK and up to approximately 180 W/mK. Thus, the wall 204 includes a second layer 406 that provides relatively high heat conduction in an X and Y direction while providing relatively low heat conduction in a Z direction in order to spread the heat from the component 210 in the X and Y direction very quickly while restricting the spread of the heat towards the outer surface 204a of the chassis base 202. This results in the heat from the component 210 being greatly diffused throughout the second layer 406 before it spreads through the first layer 402 and reaches the outer surface 204a of the chassis base 202, reducing the occurrence of "hot spots" on the outer surface 204a of the chassis base 202.

Thus, an "ultrathin" IHS has been described that provides a thin walled chassis base that prevents hot spots on the outer surface of IHS by using a composite material that quickly spreads the heat before allowing that heat to reach the outer surface. Such a structure is enabled by the use of a carbide-based composite material layer with a relatively low thermal conductivity that greatly restricts heat flow towards outer surface while allowing the heat to spread in directions parallel to the outer surface. The carbide-based composite material layer, and its oxidized layer in some embodiments, include a thickness on the order of micrometers, and thus do not greatly increase the thickness of the chassis base while providing the beneficial heat conduction properties discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis, comprising:
   a chassis base defining a housing that is configured to house a plurality of components, wherein the chassis base includes a chassis wall having an outer surface that is located on the chassis wall and a housing surface that is located on the chassis wall opposite the chassis wall from the outer surface;
   a first layer of the chassis wall that provides the outer surface of the chassis wall, wherein the first layer includes a first material and a first layer oxidized surface of the first material that has been oxidized and that is located opposite the first layer from the outer surface of the chassis wall; and
   a second layer of the chassis wall that is located immediately adjacent the housing and that provides the housing surface, wherein the second layer includes a carbide-based composite material throughout the second layer and a second layer oxidized surface of the carbide-based composite material that has been oxidized and that is bonded with the first layer oxidized surface, and wherein the carbide-based composite material provides a thermal conductivity of less than 1 watt per meter-kelvin throughout the chassis wall in a direction that is generally perpendicular to the outer surface of the chassis wall, while providing a thermal conductivity of at least 100 W/mK throughout the chassis wall in directions that are generally parallel to the outer surface of the chassis wall.

2. The chassis of claim 1, wherein the carbide-based composite material includes a graphene material and a polymer material.

3. The chassis of claim 1, wherein the carbide-based composite material includes a graphene material, a polymer material, and an aerogel material.

4. The chassis of claim 1, wherein the second layer is less than 500 micrometers thick, and the first layer and the second layer have a combined thickness of 1 millimeter or less.

5. The chassis of claim 1, wherein the second layer oxidized surface includes a graphene oxide material.

6. The chassis of claim 1, wherein the first layer includes one of an Aluminum material or a Magnesium material.

7. An information handling system (IHS), comprising:
   a chassis wall including an outer surface and a housing surface that is located opposite the chassis wall from the outer surface, wherein the chassis wall define a portion of a chassis housing;
   a processing system located in the chassis housing;
   a memory system coupled to the processing system and located in the chassis housing:
   a first layer of the chassis wall that provides the outer surface of the chassis wall and includes a first material and a first layer oxidized surface of the first material that has been oxidized and that is located opposite the first layer from the outer surface of the chassis wall; and
   a second layer of the chassis wall that is located immediately adjacent the chassis housing and that provides the housing surface, wherein the second layer includes a carbide-based composite material throughout the second layer and a second layer oxidized surface of the carbide-based composite material that has been oxidized and that is bonded with the first layer oxidized surface, and wherein the carbide-based composite material provides a thermal conductivity of less than 1 watt per meter-kelvin throughout the IHS chassis wall in a direction that is generally perpendicular to the outer surface of the chassis wall, while providing a thermal conductivity of at least 100 W/mK throughout the chassis wall in directions that are generally parallel to the outer surface of the chassis wall.

8. The IHS of claim 7, wherein the carbide-based composite material includes a graphene material and a polymer material.

9. The IHS of claim 7, wherein the carbide-based composite material includes a graphene, a polymer material, and an aerogel material.

10. The IHS of claim 7, wherein the second layer is less than 500 micrometers thick, and the first layer and the second layer have a combined thickness of 1 millimeter or less.

11. The IHS of claim 7, wherein the second layer oxidized surface includes a graphene oxide material.

12. The IHS of claim 7, wherein the first layer includes one of an Aluminum material or a Magnesium material.

\* \* \* \* \*